United States Patent Office 2,832,469
Patented Apr. 29, 1958

2,832,469

ORE BENEFICIATION METHOD

James E. Lawver, Lakeland, Fla., assignor to International Minerals & Chemical Corporation, a corporation of New York No Drawing. Application September 1, 1953
Serial No. 377,972

8 Claims. (Cl. 209—127)

This invention relates to the beneficiation of multicomponent materials. More particularly, it relates to the electrostatic separation of multicomponent ore material. Still more particularly it relates to a method of treating fractions of granular ore which have become electrostatically nonresponsive in order to restore their response to electrostatic separation and thereby improve the overall recovery of the valuable mineral.

Various forms of apparatus and processing methods are encompassed in the general field of electrostatic separation. In each method two general problems have presented themselves; namely, the nature of the apparatus employed to create the electrostatic field, and the means or mechanism by which the feed material is advantageously rendered susceptible to the forces exerted in an electrostatic field.

Two distinct methods have become commercially significant. The first method utilizes the phenomenon of conductance wherein dependence is placed upon apparatus utilizing a moving part (usually a rotating electrode) for accomplishing the electrostatic separation. As distinguished from methods utilizing the phenomenon of conductance, the method with which the instant invention is concerned utilizes the phenomenon of contact potential and, in utilizing such phenomenon, subjects the particles of ore to be separated to an electrostatic field while the particles are in a freely falling condition. In apparatus utilizing the contact potential phenomenon, the electrostatic field is maintained by suitable juxtaposition of electrodes between which substantial voltages are maintained. Electrification of the particles having taken place prior to their entry into the electrostatic field (due to the phenomenon of contact potential), the differentially charged particles are caused to be displaced from the free fall path during their travel through the electrostatic field.

An example of an apparatus utilizing the contact potential phenomenon is the Bureau of Mines publication, R. I. 3667, dated November, 1942, wherein instead of stationary electrodes, rotating cylindrical electrodes are utilized, the particles being charged by passage over a vibrating plate.

In the utilization of the contact potential phenomenon followed by separation as freely falling bodies in an electrostatic field, problems arise not only with respect to conditions compatible with effective electron transfer between the particles themselves or between the particles and an extraneous substance, as well as conditions which favor the maintenance or even enhancement of the resulting charge, but also with respect to the movement of the particles as freely falling bodies under influence, not only of gravity, but also of electrostatic forces that are simultaneously being exerted upon the particles while falling through the field.

In the course of separating material by passing the particles as freely falling bodies through the electrostatic field, collection of fractions, usually denominated tail, middling and concentrate fractions, occurs in the vicinity of the bottom of each electrode due to displacement of the particles from the normal free fall path. In the course of processing, however, not all material fed to each stage of electrostatic separation is responsive to that electrostatic field. In addition material which has been subjected to one or more passes through electrostatic fields frequently becomes nonresponsive to further passes through electrostatic fields. Material falling in the middle of the collection zone, usually called middlings, is normally returned to the feed to some electrostatic separation stage on the assumption that the particles failed to have become charged due to insufficient particle to particle contact or the like, or that random activity dissipated a prior acquired charge.

Separation work has shown that recycling of various fractions, particularly middlings, to further electrostatic separation stages, while it does result in separation of some additional material, is not capable of bringing about completeness of separation which results in high recoveries of desired components. In an attempt to increase the recoveries, light attrition grinding of concentrates from, for example, secondary electrostatic treatment stages has been resorted to and while this has improved recovery of phosphate, recoveries in the processing of Florida pebble phosphate ores have averaged only about 80% to about 88% and there has remained about 12% to about 20% of the phosphate values in the feed, depending upon its character, which refuses to respond to electrostatic field separations irrespective of the field strength or the number of passes through said fields.

Now it has been discovered that recovery of phosphate can be increased to about 95% or better when material which is not responsive to an electrostatic field is subjected to a washing and scrubbing operation. Such washing and scrubbing may be carried out either in a separate unit or by recycling the material to the washer preparing feed for the separation system.

The electrostatic beneficiation process as applied to Florida pebble phosphate ores comprises an ore feed washing operation, a drying operation, differential electrification of the particles prior to each passage through an electrostatic field, and subjection of the differentially electrified particles to the attractive and repulsive forces of a number of electrostatic fields through which the materials pass as freely falling bodies.

Florida pebble phosphate ore is subjected to a conventional desliming step as the first stage of preparation for electrostatic separation. Deslimed pebble phosphate ore shows only ineffective differential electrification and poor response to electrostatic fields. Therefore, in the instant process the deslimed phosphate material is further cleaned by agitation of the solids in an aqueous heavy slurry, from there subjecting the solids to a washing step in a suitable apparatus such as a classifier. A typical washing operation which cleans the phosphate ore to the proper degree involves passage in series through a spiral classifier, a slurry mixer, and a rake classifier in which the sands are subjected to a strong spray of water.

Following dewatering of the solids, a feed is obtained having a moisture content between about 7% and about 20%. This washed feed must be rendered dry before passage through electrostatic separation units.

The drying of Florida phosphate pebble ore or washer debris presents a unique drying problem which is usually not encountered in the drying of hard rock ores. The drying operation must be controlled as to temperature as well as to length of time and to degree of agitation. The chief characteristic which differentiates Florida phosphate ore from hard phosphate rock such as Montana and Tennessee rock is its soft attritionable character. This ore develops surface conditions when agitated, particularly to the dry or substantially dry state, which cause the ore to show poor response to electrostatic fields. The greater the degree of agitation, particularly when dry, the poorer is the response of soft phosphate ore to electrostatic fields. For economy sake, the drying process which is not the subject of the instant application is usually carried out in two stages; the first of which involves considerable agitation in order to get a high rate of heat transfer, and the second stage of which is carried out under conditions either of no agitation or conditions which minimize the effect of agitation.

Following drying of the ore, the particles are rendered susceptible to the forces existing in an electrostatic field by differential electrification. Various methods of suitably charging particles to effect differential electrification of different components are well known and include not only the imparting of charges to the particles by means of frictional contact thereof with a source of free electrons such as a donor plate, but also include the differential charging of the particles as a result of exchange of electrodes therebetween upon the effecting of contact between particles of different components of the feed material.

In order to develop the optimum condition of differential electrification per unit of particle mass of the phosphate particles, the particles are heated to temperatures in excess of about 300° F. and preferably are agitated in a manner insuring frictional or rubbing contact between the particles during the cooling off to the preferred separation temperature range of between about 250° F. and about 125° F. At the time of charging and separation, the particles may be at a temperature below 125° F., provided conditions are maintained to insure that the particles do not take on surface moisture such as would dissipate electrical charges. Maintenance of the particles at a temperature in the range between about 125° F. and about 250° F. is one way of insuring a dry surface condition. When charging concentrate fractions, particularly of relatively high purity, contact potential, i. e., differential charging by rubbing together of particles of different materials, will give only ineffective charging as to one component and at this stage use of a donor element is generally advantageous. By "donor element" is meant an element of low work function which readily exchanges electrons with the ore particles when the element is grounded to the earth. Such donor elements may be plates of graphite, galvanized iron, zinc, aluminum and the like. This differential electrification may be created, for example, by passage of the particles down an inclined chute (preferably vibratory) during the cooling operation or after reaching separation temperature.

Differentially charged particles are next passed as freely falling bodies through one or more electrostatic fields. The strength of the electrostatic field which will effectively alter the path of ore particles varies with the average particle size, unit charge, and the type of material. The field gradient or strength may vary from about 1,000 volts to about 5,000 volts per inch of distance between electrodes in separating materials of relatively fine particle size, and from about 3,000 volts to about 15,000 volts per inch for beneficiating of coarser particles. In all such discussion of field strength it must be borne in mind that corona discharges which ionize air are to be avoided. In general, it is preferred to operate with a total impressed difference of potential in the range of about 30,000 volts to about 250,000 volts. This voltage should be maintained in the form of a direct current potential substantially free of alternating current components, i. e., filtered direct current low in the so-called alternating current ripple. A steady supply of direct current may also be obtained with less expensive filtering apparatus by the use of such equipment as a rectified radio frequency power supply.

When the material to be separated passes through a series of electrostatic fields, the preferred mode of operation provides for the collection of three fractions from each electrostatic field. The concentrate fraction from each separation unit in this arrangement becomes the feed of the next or cleaner electrostatic field in series. A middling fraction is usually recycled to a point where the composition of the recycled middling material corresponds roughly to the composition of the feed material to a separation unit. Tail fractions may or may not be combined with other tail fractions or similar bone phosphate of lime content middling fractions, and usually are passed to so-called scavenger electrostatic separations to separate recoverable values from the final or discard tail product. Fractions obtained in the course of electrostatic processing, for whatever the reason may be, regularly show a marked reduction in response to further electrostatic separation. For example, a middling fraction particularly from the first or rougher separation stage as well as middlings from concentrate treating or so-called cleaner stages show a progressive increase in the quantity of material nonresponsive to electrostatic separation. In the course of several hours of operation, after which time operations level off, the concentration of phosphate in the throwaway tail fraction reaches a steady level which level is higher than the bone phosphate of lime content initially found in the tail product. This steady state when operating with about a 28% B. P. L. feed to produce a 75% B. P. L. concentrate shows a recovery of phosphate of about 75% to about 85%.

On the other hand, the various recycle fractions which have become inert to the charging mechanics of contact potential are recirculated to the washing operation. The products, i. e., tail and concentrate, show little change in B. P. L. content; but the overall recovery of phosphates rises to between about 92% and about 96%. The weight of this fraction varies usually between about 5 to about 20 weight percent of the original feed.

The invention will be more fully understood from the following examples.

*Example 1*

Florida pebble phosphate obtained as washer debris having by screen analysis particles in the size range of −1 millimeter +65 mesh was subjected to scrubbing with water in a washing unit consisting of an Akins classifier and an agitation tank. The scrubbing was performed in the agitation unit at 70% solids and dewatered in a Hardinge drag classifier.

The solids from the classifier had a water content of about 18%. This wet ore was stored until the ore had drained to a moisture content of about 12%. The solids were dried while being transferred in the vertical pipe as particles suspended in gases having a mass velocity approximately four times that required for fluidizing the particles. This gas had a stack inlet temperature of about 2500° F. Solids collected from the solids-gas separation cyclone had a temperature of approximately 195° F. The solids were reduced to ultimate dryness on a hearth where the solids were slowly raked for about 5 minutes while gases having a temperature of about 1800° F. passed over them so that the temperature of the solids when removed from the hearth was about 300° F.

The solids were cooled to a temperature of approximately 250° F. and were delivered to a vibrating trough for discharge of the particles as freely falling bodies between the electrodes of the first of a series of similar electrostatic separation units having the electrodes spaced approximately 10 inches apart and maintained at a potential gradient of approximately 9,000 volts per inch. The rate of feed of the dry granular material was approximately one ton per hour per linear foot of electrode breadth.

The electrostatic separation units were arranged so that material flow was as follows: The material having a bone phosphate of lime content of 40.75% was passed through a first or rougher separation stage. The tail or silica product from this first stage contained about 44% of the weight of the feed and assayed about 3% B. P. L. The phosphate concentrate from this first stage assayed about 71.8% B. P. L. The rougher concentrate was passed through a second or so-called "cleaner" stage of separation. The tail fraction from this second stage which contained about 9% of the weight of the feed assayed about 57.5% B. P. L. The second stage concentrate contained about 46.8% of the original weight of the feed and assayed about 73.2% B. P. L. This second stage concentrate was relatively nonresponsive to an electrostatic field so the material was passed through a hammer mill which had no screen therein so as to give the particles a light attrition grinding. The ground or so-called impacted concentrate was passed through a third stage of electrostatic separation. The concentrate fraction from the third separation stage contained about 40% of the original weight of the feed and assayed about 74% B. P. L. The tail fraction from the third stage containing about 7% of the weight of the original feed was combined with the tail fraction from the second stage. These tail fractions contained approximately 16% of the weight of material in the feed. The combined tails were water washed in the same manner as the original feed. The "sands" or rewashed material was dried in the conveying type drier and reduced to ultimate dryness on a hearth in the same manner as the original feed. The rewashed tails were passed through a fourth stage of electrostatic separation. This fourth stage produced a concentrate containing about 11% by weight and assayed about 72.2% B. P. L. This fourth stage concentrate was combined with the third stage concentrate to form a composite containing 51.5% by weight of the material in the feed and assaying approximately 73.3% B. P. L. This constituted a recovery of phosphate of approximately 93.2%.

*Example II*

Florida pebble phosphate obtained as washer debris having by screen analysis particles in the size range of −1 millimeter +150 mesh after having been through the usual desliming operation for flotation plant beneficiation was scrubbed and dewatered in the same apparatus used for treatment of material of Example I.

The solids were dried in the same manner as in Example I. The dry product assayed approximately 28.2% B. P. L. The dry product was cooled to a temperature of approximately 240° F. and delivered to a vibrating trough for discharge of the particles as freely falling bodies between the electrodes of the first of a series of electrostatic units, maintained at approximately the same potential gradient as in Example I; i. e., 9,000 volts per inch of distance between electrodes. The rate of feed of solids was the same as in Example I.

The electrostatic separation units were arranged so that the material flow was as follows: The unsized feed was passed through a first stage of separation to produce three fractions. The tail or silica fraction contained about 58% of the weight of material in the feed and assayed about 2% B. P. L. Material constituting approximately 2.4% of the weight of the feed appeared as a middling fraction. The first stage concentrate containing approximately 39.5% of the weight of material in the feed assayed approximately 71.5% B. P. L., and was passed through a second electrostatic stage. A tail fraction from the second stage containing approximately 10.8% of the weight of the original feed was segregated. The second stage concentrate containing approximately 28.7% of the weight of material in the feed assayed approximately 75.6% B. P. L.

The second stage concentrate was delivered directly to a third separation stage. The third stage produced a tail having approximately 1.4% of the weight of material in the original feed. The third stage concentrate containing approximately 27.3% of the weight of material in the original feed assayed approximately 75.6% B. P. L.

The tail fractions from the second and third separation stages were combined with the middling fraction from the first separation stage to produce a composite feed to a fourth separation stage totaling about 14.6% of the weight of material in the original feed. The fourth separation stage produced a tail fraction having about 4.4% of the original feed weight and assayed about 10.6% B. P. L. The fourth separation stage concentrate contained about 10.2% of the weight of the original feed material, and assayed approximately 67.6% B. P. L.

The fourth stage concentrate was recycled to the water wash and scrubbing section for treatment in the same manner as the original feed. The water washed fourth stage concentrate was next dried in the equipment used to dry the original feed.

Dried rewashed and recycled concentrate was separated in a fifth stage of electrostatic separation. Concentrate from the fifth stage contained approximately 7.5% of the weight of the original feed and assayed approximately 73.5% B. P. L.

This fifth stage concentrate was combined with the third stage concentrate to give a combined concentrate containing approximately 34.8% of the weight of the original feed and assaying approximately 75.5% B. P. L., this giving an overall recovery of approximately 92.8%. The fifth stage tail fraction was combined with the tail fractions from the first and fourth stages to produce a combined throwaway silica tail product containing approximately 65.2% of the weight of the original feed.

*Example III*

Florida pebble phosphate obtained as washer debris having by screen analysis particles in the size range of −1 millimeter +150 mesh after having been through the usual desliming operation for flotation plant beneficiation may be scrubbed and dewatered in the same apparatus used for treatment of material of Example I.

The deslimed solids were dried in a conveying system under conditions whereby the solids were recovered at a temperature of approximately 325° F. to give a feed analyzing approximately 29% B. P. L. Separation of this dry feed after cooling to a temperature of approximately 250° F. in a first or rougher stage produced a throwaway tail product containing approximately 5% B. P. L. The middlings from this rougher separation in closed circuit arrangement were recycled to the feed. The concentrate (assaying about 66% B. P. L.), being relatively nonresponsive when prepared from material dried in a single stage conveying type drier, was rewashed in the same apparatus as was used to scrub and dewater the feed material.

The dewatered concentrate was dried the second time in the conveying type drier used in Example I and the solids recovered dry at a temperature of approximately 250° F. After cooling to a temperature of approximately 250° F., the washed concentrate, separated in a second stage of separation, produced a final concentrate assaying approximately 76% B. P. L. The middling fraction obtained from the second separation stage was recycled to the second stage feed in this apparatus arrangement. The tail fraction obtained in the second separation stage was recycled to the feed to the first stage in this two stage operation.

*Example IV*

Florida pebble phosphate obtained as washer debris having by screen analysis particles in the size range of −14 +200 mesh was scrubbed, drained and dried in the same manner as in Example I.

Phosphate ore particles removed from the drying hearth at a temperature of about 300° F. were cooled to approximately 250° F. and delivered to a vibrating trough for discharge as freely falling bodies between the first of a series of similar electrostatic units, the electrostatic separation units being the same as described in Example I with merely the arrangement being changed so that the material flow was as follows:

The unsized phosphate ore feed (assaying approximately 28% B. P. L.) was passed through a first separation stage to produce three fractions, viz., a throwaway tail fraction of approximately 5% B. P. L., a middling fraction and a concentrate fraction of approximately 62% B. P. L. The first stage concentrate (containing approximately 40% of the feed material) was passed through a second electrostatic separation stage in which was produced a tail fraction of approximately 40% B. P. L., a middling fraction which was recycled to the feed, and a second stage concentrate of approximately 75% B. P. L.

The first stage middling fraction was subjected to a scavenger electrostatic separation stage to produce a tail fraction which, when combined with the first stage tail fraction, was discharged to waste. The middling fraction from the scavenger stage was recycled to the feed to that stage. The concentrate from the scavenger separation of approximately 35% B. P. L. was combined with the tail fraction from the second electrostatic separation stage. This combined scavenger concentrate and second stage tail was separated in a second scavenger stage to produce a tail fraction of approximately 30% B. P. L., a middling fraction which was recycled to the feed to the second scavenger stage, and a concentrate of approximately 65% B. P. L. The concentrate from the second scavenger stage, when subjected to impacting in a hammer mill from which the screen was removed (so that the material was given merely attrition grinding) and reheated to approximately 250° F., was separated into a concentrate of approximately 76% B. P. L., and a tail fraction which had a B. P. L. content approximately that of the first stage concentrate and, therefore, was recycled to the second separation stage.

The tail fraction of approximately 30% B. P. L., when washed, scrubbed and dried in the same manner as the feed to the first stage, and separated in an individual separation step, produced a concentrate of approximately 70% B. P. L. with a 7% B. P. L. tail fraction. In the regular operation of the plant this material from the second scavenger stage would be recycled so that it joins the original feed to the washer circuit. The above mentioned 70% B. P. L. concentrate from this fraction indicates that the recycle of this material after washing increases the recovery of phosphate in the circuit from approximately 88% to approximately 94%.

The above examples show that various fractions obtained from electrostatic separation units when showing weak response to electrostatic fields will be reactivated by washing so that satisfactory splits can be made and an improved recovery achieved.

Having thus fully described and illustrated the character of the invention, what is desired to be secured and claimed by Letter Patent is:

1. In a process for dry beneficiation of Florida pebble phosphate ore by electrostatic separation of freely falling bodies, the steps comprising washing an electrostatic nonresponsive fraction which has been recovered from an electrostatic separation step to clean the surface of the particles, and after drying the washed material and inducing the dried material to accept differential electrical charges, subjecting the charged particles to further electrostatic separation as freely falling bodies.

2. In a process for electrostatically beneficiating Florida pebble phosphate ore, the method for improved phosphate recovery which comprises washing deslimed phosphate bearing material, drying said washed material, inducing the dried particles to accept differential electrical charges, subjecting the charged particles to electrostatic separation as freely falling bodies, recovering a low phosphate content fraction, a phosphate concentrate fraction, and a middling fraction, and rewashing at least a portion of a phosphate concentrate fraction to clean the surface of the particles before passage as freely falling bodies through additional electrostatic separation stages.

3. In a process for electrostatically beneficiating Florida pebble phosphate ore, the method for improved phosphate recovery which comprises water washing deslimed phosphate bearing material, drying said washed material, inducing the dried particles to accept differential electrical charges, subjecting the charged particles to electrostatic separation as freely falling bodies, recovering a low phosphate content fraction, a phosphate concentrate fraction, and a middling fraction, and rewashing at least a portion of a middling fraction to clean the surface of the particles before passage as freely falling bodies through additional electrostatic separation units.

4. In a process for electrostatically beneficiating Florida pebble phosphate ore, the method for improved phosphate recovery which comprises washing deslimed phosphate bearing material, drying said washed material, inducing the dried particles to accept differential electrical charges, subjecting the charged particles to electrostatic separation as freely falling bodies, recovering from the rougher separation stage a low phosphate content fraction, a phosphate concentrate fraction, and a middling fraction, and recycling at least a portion of said rougher middling fraction to the washing step to clean the surface of the particles before passage as freely falling bodies through additional electrostatic separation units.

5. In a process for electrostatically beneficiating Florida pebble phosphate ore, the method for improved phosphate recovery which comprises washing deslimed phosphate bearing material, drying said washed material, inducing the dried particles to accept differential electrical charges, subjecting the charged particles to electrostatic separation as freely falling bodies in a first separation stage, recovering from said stage a phosphate concentrate fraction for feed to a cleaner separation stage, recovering from said cleaner stage a low phosphate content fraction, a phosphate concentrate fraction, and a middling fraction, and rewashing at least a portion of said low phosphate content fraction to clean the surface of the particles before passage as freely falling bodies through additional electrostatic separation units.

6. In a process for electrostatically beneficiating Florida pebble phosphate ore, the method for improved phosphate recovery which comprises washing deslimed phosphate bearing material, drying said washed material, inducing the dried particles to accept differential electrical charges, subjecting the charged particles to electrostatic separation as freely falling bodies in a first separation stage, recovering a low phosphate content fraction from said first stage for use as a feed to scavenger separation units, recovering from said scavenger separation units a low phosphate content fraction and a phosphate concentrate fraction, and rewashing at least a portion of said low phosphate content fractions to clean the surface of the particles before passage as freely falling bodies through additional electrostatic separation units.

7. In a process for electrostatically beneficiating Florida pebble phosphate ore, the method for improved phosphate recovery which comprises washing deslimed phosphate bearing material, drying said washed material, inducing the dried particles to accept differential electrical charges, subjecting the charged particles to electrostatic separation as freely falling bodies, recovering from the first separation step a low phosphate content fraction, a phosphate concentrate fraction, and a middling fraction, separating the concentrate fraction in a cleaner separation stage to recover a low phosphate content cleaner fraction, a phosphate concentrate fraction, and a cleaner middling fraction, combining the tail fractions from the cleaner stages with the middling fraction from the rougher stage, and rewashing at least a portion of said combined fractions to clean the surface of the particles before passage as freely falling bodies through additional electrostatic separation stages.

8. In a process for electrostatically beneficiating Florida pebble phosphate ore, the method for improved phosphate recovery which comprises washing deslimed phosphate bearing material, drying said washed material, inducing the dried particles to accept differential electrical charges, subjecting the charged particles to electrostatic separation as freely falling bodies, recovering from a first rougher stage a low phosphate content fraction, a phosphate concentrate fraction, and a middling fraction, feeding the phosphate concentrate fraction to a second and third separation stage, recovering a low phosphate content tail fraction from each stage, and a phosphate concentrate fraction from said third separation stage, combining the tail fractions, and rewashing at least a portion of said combined fractions to clean the surface of the particles before passage as freely falling bodies through additional electrostatic separation stages.

References Cited in the file of this patent

UNITED STATES PATENTS

| | | |
|---|---|---|
| 2,168,681 | O'Brien | Aug. 8, 1939 |
| 2,197,865 | Johnson | Apr. 23, 1940 |